US008577607B2

(12) United States Patent
Williamson (10) Patent No.: US 8,577,607 B2
(45) Date of Patent: Nov. 5, 2013

(54) GPS/INS SENSOR FUSION USING GPS WIND UP MODEL (75) Inventor: Walton R. Williamson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 147 days.

(21) Appl. No.: 13/230,718

(22) Filed: Sep. 12, 2011

(65) Prior Publication Data

US 2012/0065883 A1 Mar. 15, 2012

Related U.S. Application Data (60) Provisional application No. 61/382,333, filed on Sep. 13, 2010.

(51) Int. Cl.
*G01C 21/10* (2006.01)
*G01S 19/05* (2010.01)
*G06F 19/00* (2011.01)

(52) U.S. Cl.
USPC ............... 701/501; 701/505; 342/357.49

(58) Field of Classification Search
USPC ........... 701/501, 500, 505, 477; 342/357.49, 342/357.42
See application file for complete search history.

(56) References Cited

U.S. PATENT DOCUMENTS 6,934,632 B2 * 8/2005 Hatch ........................ 701/477
2007/0159387 A1 * 7/2007 Syrjarinne et al. ....... 342/357.09

OTHER PUBLICATIONS

Bar-Sever, et. al., "Estimating horizontal gradients of tropospheric path delay with a single GPS receiver," Journal of Geophysical Research, vol. 103, No. B3, pp. 5019-5035, Mar. 10, 1998.
Bar-Sever et. al., "Fixing the GPS Bad Attitude: Modeling GPS Satellite Yaw During Eclipse Seasons," Navigation, vol. 43, No. 1, Spring 1996.
Blewitt, "Carrier Phase Ambiguity Resolution for the Global Positioning System Applied to Geodetic Baselines up to 2000 km," Journal of Geophysical Research, vol. 94, No. B8, pp. 10, 187-10, 203, Aug. 10, 1989.

(Continued)

*Primary Examiner* — Tan Q Nguyen
(74) *Attorney, Agent, or Firm* — Milstein Zhang & Wu LLC; Joseph B. Milstein (57) ABSTRACT

A method of stabilizing an inertial navigation system (INS), includes the steps of: receiving data from an inertial navigation system; and receiving a finite number of carrier phase observables using at least one GPS receiver from a plurality of GPS satellites; calculating a phase wind up correction; correcting at least one of the finite number of carrier phase observables using the phase wind up correction; and calculating a corrected IMU attitude or velocity or position using the corrected at least one of the finite number of carrier phase observables; and performing a step selected from the steps consisting of recording, reporting, or providing the corrected IMU attitude or velocity or position to another process that uses the corrected IMU attitude or velocity or position. A GPS stabilized inertial navigation system apparatus is also described.

16 Claims, 2 Drawing Sheets (56) References Cited

OTHER PUBLICATIONS

Wu, et. al., "Effects of orientation on GPS carrier phase," Manuscripta Geodetica vol. 18, pp. 91-98, 1993.

Zumberge, et. al., "Precise Point Positioning for the Efficient and Robust Analysis of GPS data from Large Networks," Journal of Gepohysical Research, vol. 102, No. B3, pp. 5005-5017, Mar. 10, 1997.

Gao, et. al., "Development of a Real-Time Single-Frequency Precise Point Positioning System and Road Test Results," Proceedings of the 19th International Technical Meeting of the Satellite Division of the Institute of Navigation (ION GNSS 2006), Fort Worth, TX, Sep. 2006, pp. 2297-2303.

Wolfe, et. al., "Target Association Using Detection Methods," Journal of Guidance, Control and Dynamics, vol. 25, No. 6, Nov.-Dec. 2002.

Williamson, et. al., "Sensor Fusion Applied to Autonomous Aerial Refueling," Journal of Guidance, Control, and Dynamics, vol. 32, No. 1, Jan.-Feb. 2009.

Hong, et. al., "Observability Analysis of GPS Aided INS," Proceedings of the 2000 Institute of Navigation, Salt Lake City, Utah, Sep. 2000.

* cited by examiner

GPS/INS SENSOR FUSION USING GPS WIND UP MODEL

CROSS-REFERENCE TO RELATED APPLICATIONS

This application claims priority to and the benefit of co-pending U.S. provisional patent application Ser. No. 61/382,333, filed Sep. 13, 2010, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to inertial navigation in general and particularly to an inertial navigation system that employs a GPS correction of inertial navigation system errors.

BACKGROUND OF THE INVENTION

Methods for compensating inertial navigation with GPS have been described, for example, by Williamson, et. al., in "Sensor Fusion Applied to Autonomous Aerial Refueling, Journal of Guidance, Control, and Dynamics," Vol. 32, No. 1, January-February 2009, Britting, in Inertial Navigation Systems Analysis, Wiley-Interscience, New York, 1971, and S. Hong, et. al., in Observability Analysis of GPS Aided INS, Proceedings of the 2000 Institute of Navigation, Salt Lake City, Utah, September 2000. Also, recent advances in GPS technology such as have been described by Y. E. Bar-Sever, et. al., in "Estimating horizontal gradients of tropospheric path delay with a single GPS receiver," Journal of Geophysical Research, Vol. 103, no. B3, pages 5019-5035, Mar. 10, 1998, describe the ability to resolve integer ambiguity between a GPS receiver and the GPS satellite. The ability to resolve integer ambiguity between a GPS receiver and the GPS satellite can be used to increase position accuracy, as well as to compensate inertial drift errors by use of GPS observables.

However, most of the carrier phase observables of interest are affected by the "phase wind up effect" which has been described by Wu, et. al., in "Effects of antenna orientation on GPS carrier phase," Manuscripta Geodetica Vol. 18, pages 91-98, 1993. The phase wind up effect causes the GPS carrier phase to advance as the GPS antenna rotates. In present day GPS compensated INS systems, there are wind up errors such as wind up errors caused by caused by the rotation of a GPS antenna.

There is a need for a system and method which can correct an inertial navigation system for inertial navigation system errors caused by carrier phase wind up.

SUMMARY OF THE INVENTION

According to one aspect, the invention features a method of stabilizing an inertial navigation system (INS), which includes the steps of: performing the following steps in any order: receiving data from an inertial navigation system having an inertial measurement unit (IMU); and receiving a finite number of carrier phase observables using at least one GPS receiver from a plurality of GPS satellites; performing the following series of calculations: calculating a phase wind up correction; correcting at least one of the finite number of carrier phase observables using the phase wind up correction; and calculating a corrected IMU attitude or velocity or position using the corrected at least one of the finite number of carrier phase observables; and performing a step selected from the steps consisting of recording the corrected IMU attitude or velocity or position, reporting the corrected IMU attitude or velocity to a user, and providing the corrected IMU attitude or velocity or position to another process that uses the corrected IMU attitude or velocity or position.

In one embodiment, the method further comprises the step of providing the corrected IMU attitude or velocity or position to the INS.

In another embodiment, the INS receives the corrected IMU attitude or velocity or position.

In yet another embodiment, the step of calculating a corrected IMU attitude or velocity or position includes calculating a corrected IMU attitude or velocity or position using the corrected at least one of the finite number of carrier phase observables with full state observability.

In yet another embodiment, the steps of calculating a phase wind up correction and correcting at least one of the finite number of carrier phase observables using the phase wind up correction are performed using the following equations:

$$\phi_{xi} = \tan^{-1}\left(\frac{d_y}{d_x}\right),$$

and $\phi_{xi} - \bar{\phi}_{xi} = H_{MGEKF} H_{\phi i} H_D \delta_x$, where $$H_{MGEKF} = \frac{-F \tan^{-1}(\Psi)}{\Psi},$$

and $H_{\phi i} = [\sin(\tilde{\beta}_i) - \cos(\tilde{\beta}_i) 0]$.

In yet another embodiment, the steps of calculating a phase wind up correction and correcting at least one of the finite number of carrier phase observables using the phase wind up correction are performed using the following equations:

$$\bar{\phi}_{xi} = \tan^{-1}\left(\frac{\bar{D}_y}{\bar{D}_x}\right),$$

and $\phi_{xi} - \bar{\phi}_{xi} = H_A H_B H_D \delta x$, where $$H_A = \frac{2}{1 + \left(\frac{\bar{D}_y}{\bar{D}_x}\right)^2} \frac{\bar{D}_y}{\bar{D}_x},$$

and $$H_B = \left[\frac{1}{\bar{D}_x} \quad -\frac{\bar{D}_y}{\bar{D}_x^2} \quad 0\right].$$

In yet another embodiment, the step of receiving a finite number of carrier phase observables includes receiving a finite number of carrier phase observables using at least one GPS receiver from a plurality of GPS satellites using a GPS receiver having a plurality of GPS antennas disposed at different angles with different dipole definitions in a coordinate reference system and wherein the step of performing the following series of calculations includes calculating a phase wind up correction for each of the plurality of GPS antennas disposed at different angles.

In yet another embodiment, the step of receiving a finite number of carrier phase observables includes receiving a finite number of carrier phase observables using at least one GPS receiver from a plurality of GPS satellites using a plurality of GPS antennas disposed substantially in a circle and wherein the step of performing the following series of calculating includes calculating a phase wind up correction for each of the plurality of GPS antennas disposed substantially in a circle.

In yet another embodiment, the method of stabilizing an inertial navigation system further includes a GPS receiver having at least one GPS antenna which is present on a first vehicle, and a second GPS receiver having at least one GPS antenna is configured to perform the method of claim 1 on a second vehicle different from the first vehicle, and further including a step of using a single or double differenced carrier phase measurement to provide a range between the first and second vehicles.

In yet another embodiment, the step of calculating a corrected IMU attitude or velocity or position provides an enhanced accuracy yaw angle.

In yet another embodiment, the step of calculating a corrected IMU attitude or velocity or position includes calculation of an Extended Kalman Filter (EKF) or of a Square Root Information Filter (SRIF).

According to another aspect, the invention features a GPS stabilized inertial navigation system apparatus which includes at least one GPS receiver having at least one GPS antenna. An inertial navigation system (INS) has an inertial measurement unit (IMU). A data processor is communicatively coupled to the at least one GPS receiver and the IMU. The data processor is configured to receive a plurality of GPS carrier phase observables from the GPS receiver and attitude and velocity data from the IMU. The data processor includes a module which has instructions in machine-readable form recorded therein. The data processor is configured to perform, when operating under the control of the instructions, a process including the steps of: calculating a phase wind up correction; correcting at least one of the finite number of carrier phase observables using the phase wind up correction; and calculating a corrected IMU attitude or velocity or position using the corrected at least one of the finite number of carrier phase observables. At least one device selected from the group of devices including: a device configured to record the corrected IMU attitude or velocity or position, a device is configured to report the corrected IMU attitude or velocity or position to a user, and a device configured to provide the corrected IMU attitude or velocity or position to another process that uses the corrected IMU attitude or velocity or position.

In one embodiment, the INS is configured to receive the corrected IMU attitude or velocity or position to correct an INS attitude or velocity or position.

In another embodiment, the data processor is configured to calculate a corrected IMU attitude or velocity or position with full state observability.

In yet another embodiment, the GPS stabilized inertial navigation system apparatus further includes a plurality of GPS antennas disposed at different angles.

In yet another embodiment, the GPS stabilized inertial navigation system apparatus further includes a plurality of GPS antennas disposed substantially in a circle.

In yet another embodiment, the data processor is configured to provide an enhanced accuracy yaw angle.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

As described hereinabove, the phase wind up effect causes the carrier phase to advance as the GPS antenna rotates. This unique signature of the resolved ambiguity phase enables the observability and stabilization of the inertial navigation system yaw and yaw bias, states that are weakly observable without significant and time varying inertial acceleration. Enabling the use of carrier phase wind up models to correct the inertial errors is expected to have a significant impact on the production and use of low cost inertial systems for scientific and real time applications, since the yaw angle will now have an accuracy commiserate with the pitch and roll angles.

A system and method for using GPS carrier phase measurements to correct a navigation state generated by an inertial navigation system (INS) is described hereinbelow. In one exemplary embodiment, the method assumes at least one GPS receiver and one inertial navigation system operating on a single vehicle. The system and method takes advantage of a resolved integer ambiguity between the satellite and the GPS receiver in order to form precise carrier phase observables. These observables are processed within a filter structure such as the Extended Kalman Filter (EKF) to correct the INS state for drift due to error sources in the accelerometer and rate gyros. The system and method takes advantage of the carrier phase observable wind up effect to ensure that the complete attitude and the gyro bias errors are always observable, even when the GPS antenna is static (not physically moving). The inventive system and method as described hereinbelow, also fixes the GPS/INS navigation systems "yaw angle drift over time" problem, which is caused by an inability to observe yaw rate biases.

GPS/INS Sensor Fusion Method Using GPS Wind Up Model

Figure 1:
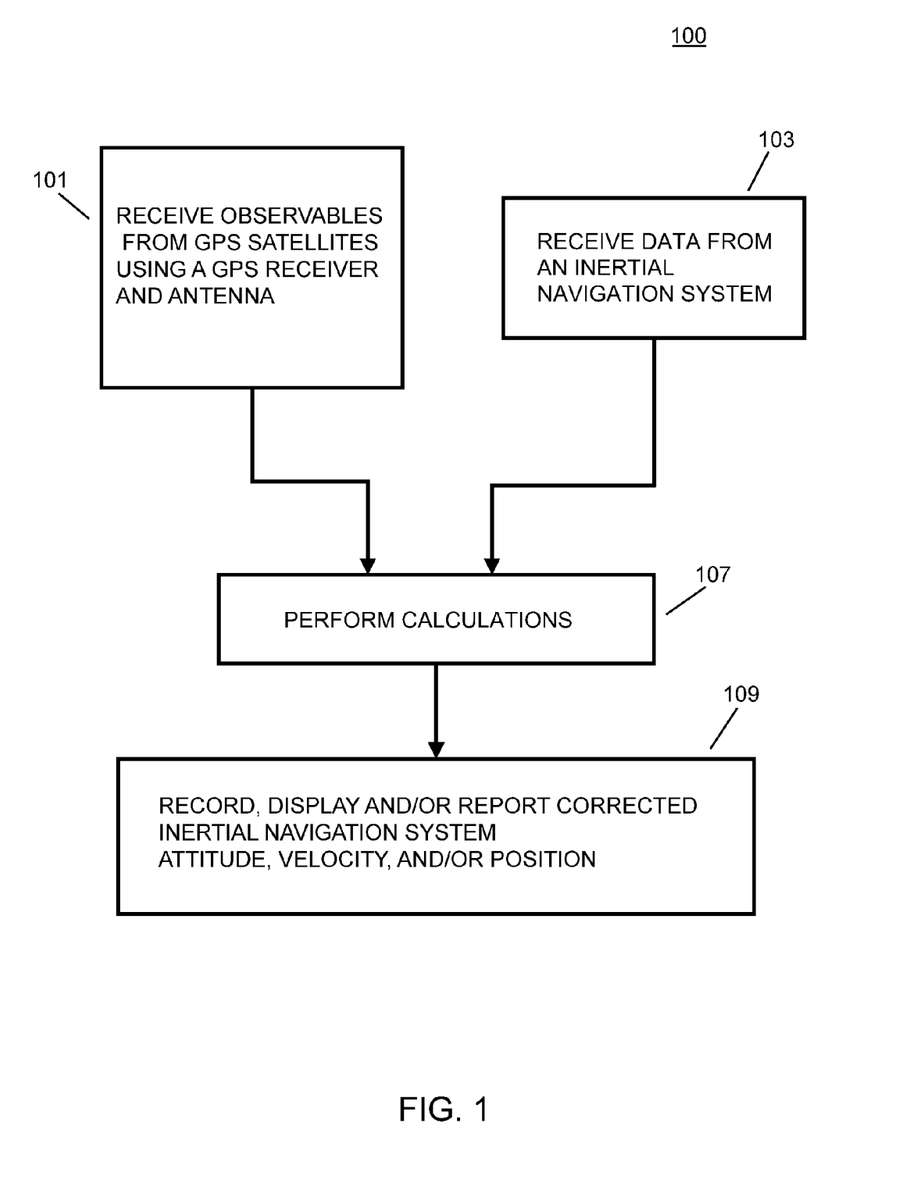
FIG. 1 shows a simplified block diagram of one exemplary method for stabilizing an inertial navigation system according to the invention.

FIG. 1 shows a simplified block diagram of one exemplary method 100 for stabilizing an inertial navigation system according to the invention. The steps are: performing the following steps in any order: (103) receiving data from an inertial navigation system having an inertial measurement unit (IMU); (101) receiving a finite number of carrier phase observables using at least one GPS receiver from a plurality of GPS satellites; and then (107) perform the following series of calculations: calculate a phase wind up correction; correct at least one of the finite number of carrier phase observables using the phase wind up correction; and calculate a corrected IMU attitude or velocity or position using the corrected at least one of the finite number of carrier phase observables; and (109) perform a step selected from the steps consisting of recording the corrected IMU attitude or velocity or position, reporting the corrected IMU attitude or velocity or position to a user, and providing the corrected IMU attitude or velocity or position to another process that uses the corrected IMU attitude or velocity or position. In one embodiment, the corrected IMU attitude or velocity or position is provided back to the INS (i.e. the INS receives the corrected IMU attitude or velocity or position).

As described in more detail below, the method can be performed with full state observability using only one GPS antenna or when using a plurality of GPS antennas. In some embodiments, the method 100 of stabilizing an inertial navigation system can be used to provide an enhanced accuracy yaw angle such as for a vehicle attitude (e.g. an aircraft, car, truck, or other type of vehicle).

In one embodiment, performing calculations 107 includes calculating a phase wind up correction and correcting at least one of the finite number of carrier phase observables using the phase wind up correction. The calculations are performed using the following equations:

$$\phi_{xi} = \tan^{-1}\left(\frac{d_y}{d_x}\right),$$

and $\phi_{xi} - \bar{\phi}_{xi} = H_{MGERF} H_{\phi i} H_D \delta_x$, where $$H_{MGEKF} = \frac{-F \tan^{-1}(\Psi)}{\Psi},$$

and $H_{\phi i} = [\sin(\tilde{\beta}_i) - \cos(\tilde{\beta}_i) 0]$. In another embodiment, performing calculations 107 includes calculating a phase wind up correction and correcting at least one of the finite number of carrier phase observables using the phase wind up correction. The calculations are performed using the following equations:

$$\bar{\phi}_{xi} = \tan^{-1}\left(\frac{\bar{D}_y}{\bar{D}_x}\right),$$

and $\phi_{xi} - \tilde{\phi}_{xi} = H_A H_B H_D \delta x$, where $$H_A = \frac{2}{1+\left(\frac{\bar{D}_y}{\bar{D}_x}\right)^2} \frac{\bar{D}_y}{\bar{D}_x}, \text{ and}$$

$$H_B = \left[\frac{1}{\bar{D}_x} \quad -\frac{\bar{D}_y}{\bar{D}_x^2} \quad 0\right].$$

In some embodiments, providing a GPS receiver with a GPS antenna 101 includes providing a plurality of GPS antennas disposed at different angles with different dipole definitions in a coordinate reference system. In other embodiments, providing a GPS receiver with a GPS antenna 101 includes providing a plurality of GPS antennas disposed substantially in a circle.

There can also be embodiments of the invention where there are two different systems that can perform the steps 100, each system being disposed in a different location, such as, for example, each system mounted in or on a different vehicle. In such systems, a single or double differenced carrier phase measurement can be used to provide a range between the two locations, such as to provide a range measurement between two vehicles.

GPS/INS Sensor Fusion System Using GPS Wind Up Model

Figure 2:
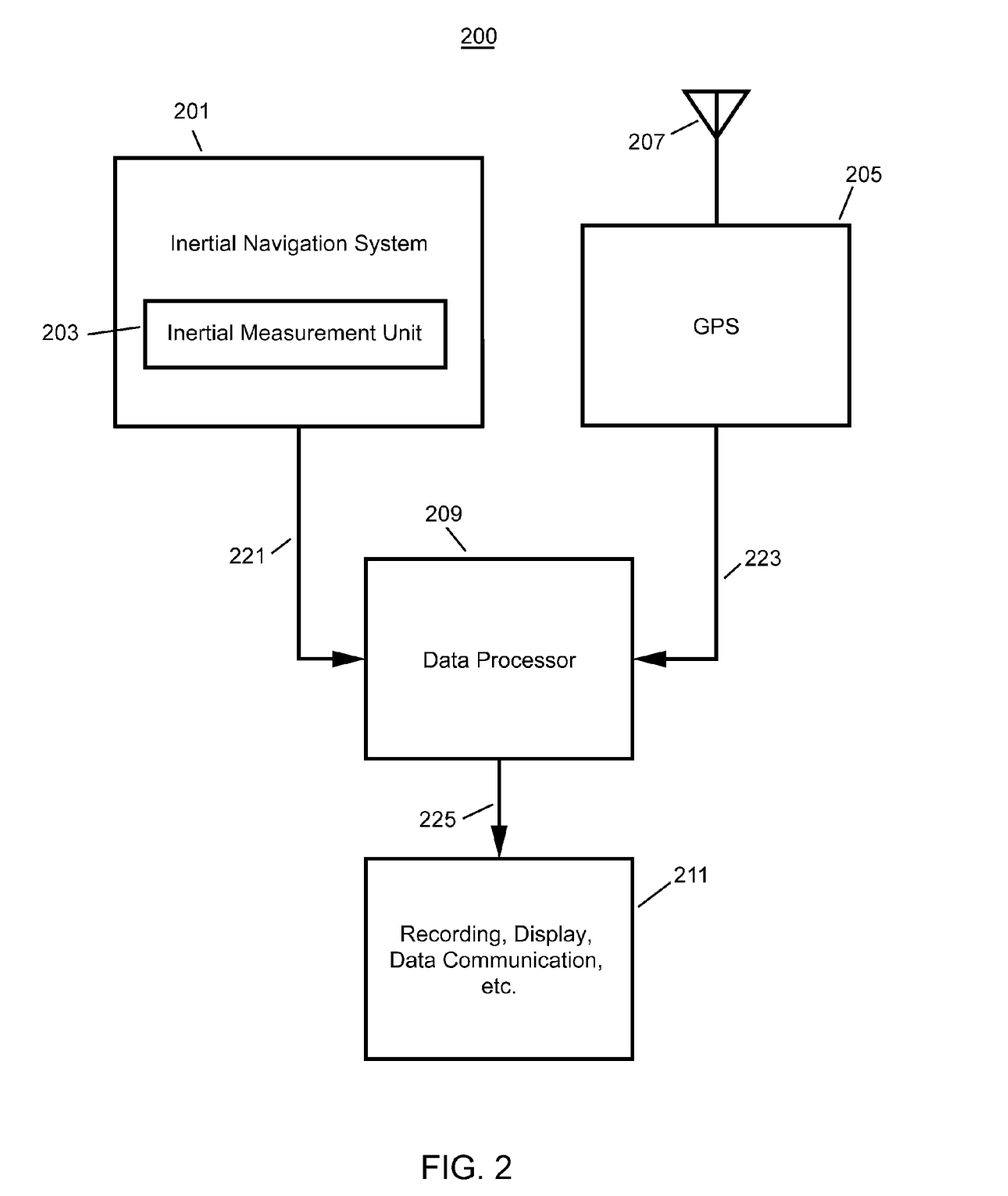
FIG. 2 shows a simplified block diagram of one exemplary system for performing the method of FIG. 1 according to the invention.

FIG. 2 shows a simplified block diagram of one exemplary system which is configured to perform the method of FIG. 1 according to the invention. A GPS stabilized inertial navigation system apparatus 200 includes at least one GPS receiver 205 having at least one GPS antenna 207. An inertial navigation system 201 has an inertial measurement unit 203 (IMU). A data processor 209, such as a general purpose programmable computer, is communicatively coupled by (via communications link 223) to the at least one GPS receiver 205 and communicatively coupled (via communications link 221) to the INS 201 and/or the IMU 203. The data processor 209 is configured to receive a plurality of GPS carrier phase observables from the GPS receiver 205 and attitude and velocity data from the INS 201 and/or the IMU 203. The data processor 209 includes a module having instructions in machine-readable form recorded therein. The data processor 209 is configured to perform, when operating under the control of the instructions, a process including the steps of: calculating a phase wind up correction; correcting at least one of the finite number of carrier phase observables using the phase wind up correction; and calculating a corrected IMU attitude or velocity or position using the corrected at least one of the finite number of carrier phase observables; and at least one device selected from the group of devices consisting of a device configured to record the corrected IMU attitude or velocity or position, a device configured to report the corrected IMU attitude or velocity or position to a user, and a device configured to provide the corrected IMU attitude or velocity or position to another process that uses the corrected IMU attitude or velocity or position. Data processor 209 can be communicatively coupled (via communications link 225) to a recording device, a display device, and/or configured for data communications with another device or system 211. The GPS stabilized inertial navigation system apparatus 200 can calculate a corrected IMU attitude or velocity or position with full state observability. The GPS stabilized inertial navigation system apparatus 200 can be configured to provide an enhanced accuracy yaw angle, such as an enhanced accuracy yaw angle of an aircraft, car, truck, or other type of vehicle.

Communication links 221, 223, and 225 are typically hard wired data communication links such as wires, cables and/or standard data bus connections. However, as can be appreciated by those skilled in the art, any suitable communication link can be used including for example, fiber optic links, or any other suitable wired or wireless communication link Typically, each corrected IMU attitude or velocity or position is also reported back to the INS to correct a present INS attitude or velocity or position value (not shown in FIG. 1 and FIG. 2).

In some embodiments (not shown in FIG. 2), the GPS antenna 207 can include a plurality of GPS antennas disposed at different angles. In other embodiments, the GPS antenna 207 can also include a plurality of GPS antennas disposed substantially in a circle. In embodiments using multiple GPS antennas, typically there is at least one GPS receiver section electrically coupled to each GPS antenna.

Inertial Navigation and Error Models

The primary instrument of an inertial navigation system (INS) is an inertial measurement unit (IMU). An IMU typically, but not necessarily, includes 3 gyros and 3 accelerometer sensors. Each of the three sensors is aligned along a respective one of an orthogonal set of axes. The IMU is usually disposed on or in a vehicle or other device or platform where the user wants to estimate at least one of the position, velocity, or attitude of the device or platform. Given an initial position, velocity, and attitude, it is possible to integrate the angular rate gyro measurements over time to update the vehicle attitude. Using the estimate of attitude, it is possible to estimate the direction of sensed gravity and remove it from the accelerometer measurements leaving only vehicle acceleration. The vehicle acceleration can then be integrated to update the velocity and the velocity integrated to update the position.

The method described in this section is similar to the methods described by Hong, et. al., in "Observability Analysis of GPS Aided INS," Proceedings of the 2000 Institute of Navigation, Salt Lake City, Utah, September 2000, and by Williamson, et. al., in "Sensor Fusion Applied to Autonomous Aerial Refueling," Journal of Guidance, Control, and Dynamics, Vol. 32, No. 1, January-February 2009, although the navigation calculations performed herein, are done in an Earth Centered Earth Fixed (ECEF) reference frame in order to more easily integrate the navigation calculations with the GPS measurement equations.

The method of using an IMU to update a navigation state can be defined by the "strap-down" equations of motion, named for the fact that the equations assume a solid state IMU that can be "strapped down" to a vehicle as opposed to moving mass and gimbaled types of gyros. However, the method and apparatus of the instant invention can be applied to any source of angular rate and acceleration data and is not restricted to solid state instruments.

Inertial Measurements

Typical IMU measurements include measurements of acceleration and angular velocity. An alternative, more common among navigation grade or better inertial systems, is to provide a measurement of change in velocity ($\Delta v$) and change in angle ($\Delta \Theta$). If the inertial acceleration of the vehicle is defined as $a_{IB}^B$ where the body frame acceleration is measured relative to the inertial frame in the vehicle body frame, then the delta velocity over a time interval $\Delta t$ is defined as:

$$\Delta v_{IB}^B = \int_0^{\Delta t} a_{IB}^B dt \quad (1)$$

Similarly, the delta theta is defined as the integration of the instantaneous angular velocity $\omega_{IB}^B$ over the time interval $\Delta t$:

$$\Delta \Theta_{IB}^B = \int_0^{\Delta t} \omega_{IB}^B dt \quad (2)$$

This analysis described hereinbelow uses $\Delta v$'s and $\Delta \Theta$'s, and assumes that body frame orientation errors are small relative to the sample time interval $\Delta t$.

Inertial measurements are subject to errors. For three purposes of the present description, these errors are lumped into an additive error referred to as the bias error. Any other suitable errors, such as for example, scale factor errors, misalignment errors, and temperature dependent errors can also be used. The measured change in velocity $\Delta \tilde{v}_{IB}^B$ is equal to the true change in velocity $\Delta v_{IB}^B$ plus the bias term $b_{\Delta v}$ in Eq. 3. In this case, the true bias $b_{\Delta v}$ is assumed constant over the interval $\Delta t$.

$$\Delta \tilde{v}_{IB}^B = \Delta v_{IB}^B + b_{\Delta v} \Delta t \quad (3)$$

Likewise, a similar bias error is defined for the angular rate gyro measurements $\Delta \tilde{\Theta}_{IB}^B$ relative to the true value $\Delta \Theta_{IB}^B$:

$$\Delta \tilde{\Theta}_{IB}^B = \Delta \Theta_{IB}^B + b_{\Delta \Theta} \Delta t \quad (4)$$

If known calibrations exist, they can be applied at each time interval. The errors modeled here account for the remaining un-calibrated error sources. One of our goals is to develop a filter using GPS measurement to estimate errors in the navigation state as well as errors in the calibration of the errors in the instruments. We define both of the true biases in terms of the estimate plus an unknown perturbation error to be estimated:

$$b_{\Delta v} = \bar{b}_{\Delta v} + \delta b_{\Delta v} \quad (5)$$

$$b_{\Delta \Theta} = \bar{b}_{\Delta \Theta} + \delta b_{\Delta \Theta} \quad (6)$$

In this case, the a priori estimate of the accelerometer bias is $\bar{b}_{\Delta v}$ and the uncertainty in the bias to be estimated is $\delta b_{\Delta v}$. Similarly, the estimate of the bias in the rate gyros is referred to as $\bar{b}_{\Delta \Theta}$ and the the uncertainty to be estimated is defined as $\delta b_{\Delta \Theta}$.

The dynamics of the uncertainty are defined as a random walk with time constants $\tau_{\Delta v}$ and $\tau_{\Delta \Theta}$ driven by independent, zero mean Gaussian noise processes $v_{\Delta v}$ and $v_{\Delta \Theta}$.

$$\delta b_{\Delta v}(t + \Delta t) = \left(1 - \frac{1}{\tau_{\Delta v}}\right) \delta b_{\Delta v}(t) + v_{\Delta v} \quad (7)$$

$$\delta b_{\Delta \Theta}(t + \Delta t) = \left(1 - \frac{1}{\tau_{\Delta \Theta}}\right) \delta b_{\Delta \Theta}(t) + v_{\Delta \Theta} \quad (8)$$

Strap Down Equations of Motion

The strap down equations of motion can be used to perform the following tasks: to remove the effects of Earth angular velocity from the angular velocity measurements, to integrate the angular velocity to update the vehicle attitude, to remove the effects of centripetal and coriolis acceleration from the acceleration measurements, to remove the effects of gravity from the acceleration measurements, to integrate the acceleration measurements to update the velocity estimate, and to integrate the velocity estimate to update the vehicle position.

The strap down equations of motion use an initial condition of the position, velocity and attitude. The initial consition can be estimated or provided using any suitable means, such as for example, by using a GPS only solution to provide position and velocity and a gyro-alignment technique to estimate an initial attitude.

The state of the vehicle x is defined as a vector including the following parameters:

$$\bar{x} = \begin{bmatrix} \bar{P}^E \\ \bar{V}^E \\ \bar{\gamma}_B^E \\ \bar{b}_{\Delta v} \\ \bar{b}_{\Delta \Theta} \\ c\bar{\tau} \end{bmatrix} \quad (9)$$

$\bar{P}^E$ is the position in the ECEF coordinate frame, $\bar{V}^E$ is the velocity estimate in the ECEF coordinate frame and $\bar{\gamma}_B^E$ is the (3x1) vector estimate of the Euler angles representing the rotation from the vehicle body frame to the ECEF frame. The estimates of the errors in the inertial system $\bar{b}_{\Delta v}$ and $\bar{b}_{\Delta \Theta}$ are included to estimate the errors in these terms as part of the filtering process. In addition, using raw pseudorange and carrier phase GPS measurements to correct the filter, a scalar clock bias error for the GPS receiver clock bias, $c\bar{\tau}$ is included, where c is the speed of light and $\bar{\tau}$ is the clock bias in seconds. A first order, stochastic model is used to simplify the notation, however higher order models can easily be employed. It is implicitly assumed that the IMU measurements are synchronized in some way to the GPS measurements so that there is effectively only one clock. Any suitable scheme including a means for propagating the navigation state relative to GPS can be used.

The vector $\bar{\gamma}$ is defined in Eq. 10 in which $\phi$ is the roll angle (rotation about the x axis), $\theta$ is the pitch angle (rotation about the y angle) and $\psi$ is the yaw angle (rotation about z axis). In this description, an aircraft coordinate frame is used in which the x axis points to fore, the y axis points to starboard, and the z axis points down. Note that the (3x3) rotation matrix $\bar{C}_B^E$ is constructed from $\bar{\gamma}$ as shown in Eq. 11 and Eq. 12 where it is noted that the Euler angles explicitly define the rotation of the body frame relative to the local North-East-Down (NED) reference frame. This rotation is represented by $\bar{C}_B^{NED}$. In addition, the rotation from the NED to the ECEF frame is defined as $\bar{C}_{NED}^E$ and this rotation matrix is purely a function of the vehicle ECEF position and the Earth model utilized (WGS-84, for instance). The Euler rotation order is useful for compatibility with an aircraft and because the $\psi$ angle is coincident with heading (angle relative to North) in most terrestrial applications. Rotations can be equivalently defined using quaternions, although this is ignored here for the sake of brevity and notation. Suitable such quaternions have been described by Zipfel, in "Modeling and Simulation of Aerospace Vehicle Dynamics," AIAA Press, 2000, pp. 121-128.

$$\bar{\gamma} = \begin{bmatrix} \phi \\ \theta \\ \psi \end{bmatrix} \quad (10)$$

$$\bar{C}_{NED}^B = \begin{bmatrix} 1 & 0 & 0 \\ 0 & \cos(\phi) & \sin(\phi) \\ 0 & -\sin(\phi) & \cos(\phi) \end{bmatrix} \begin{bmatrix} \cos(\theta) & 0 & \sin(\theta) \\ 0 & 1 & 0 \\ -\sin(\theta) & 0 & \cos(\theta) \end{bmatrix} \quad (11)$$

$$\begin{bmatrix} \cos(\psi) & \sin(\psi) & 0 \\ -\sin(\psi) & \cos(\psi) & 0 \\ 0 & 0 & 1 \end{bmatrix}$$

$$\bar{C}_B^E = \bar{C}_{NED}^E \bar{C}_B^{NED} \quad (12)$$

The strap down equations of motion proceed as follows. First, the attitude is updated. The corrected $\Delta\Theta_{EB}^B$ which angular rotation of the body frame relative to the ECEF frame in the body frame is formed from the available measurements minus the Earth rate $\omega_I E^E$ and the bias estimate $b_{\Delta\Theta}$ both integrated in time.

$$\Delta\bar{\Theta}_{EB}^B = \Delta\tilde{\Theta}_{IB}^B - ((\bar{C}_B^E)^T\omega_{IE}^E + \bar{b}_{\Delta\Theta})\Delta t \quad (13)$$

The $\Delta\tilde{\Theta}_{EB}^B$ vector represents a small angle rotation of the vehicle body frame from time t to time t+$\Delta$t. These angles are in the body coordinate frame. A cosine rotation matrix is formed from the angles, referred to as $\bar{C}_{B-}^{B+}(\Delta t)$, and is used to update the attitude of the vehicle.

$$\bar{C}_B^E(t+\Delta t) = \bar{C}_B^E(t)\bar{C}_{B-}^{B+}(\Delta t) \quad (14)$$

If we define $\Delta\bar{\Theta}_{EB}^B = [\delta\Theta_x \ \delta\Theta_y \ \delta\Theta_z]^T$, then the rotation matrix $\bar{C}_{B-}^{B+}(\Delta t)$ is defined as in Eq. 15. In this case it is assumed that the z axis rotation is first, followed by y, then x, preserving the heading-pitch-roll ordering of the rotations.

$$\bar{C}_{B-}^{B+}(\Delta t) = \begin{bmatrix} 1 & 0 & 0 \\ 0 & \cos(\delta\Theta_x) & \sin(\delta\Theta_x) \\ 0 & -\sin(\delta\Theta_x) & \cos(\delta\Theta_x) \end{bmatrix} \begin{bmatrix} \cos(\delta\Theta_y) & 0 & \sin(\delta\Theta_y) \\ 0 & 1 & 0 \\ -\sin(\delta\Theta_y) & 0 & \cos(\delta\Theta_y) \end{bmatrix} \quad (15)$$

$$\begin{bmatrix} \cos(\delta\Theta_z) & \sin(\delta\Theta_z) & 0 \\ -\sin(\delta\Theta_z) & \cos(\delta\Theta_z) & 0 \\ 0 & 0 & 1 \end{bmatrix}$$

Once the attitude is updated, the attitude is used to help remove the affects of gravity $g^E$ as well as centripetla and Coriolis acceleration due to the Earth's rotation. The updated $\Delta\bar{v}_{EB}^B$ is defined in Eq. 16. In this case the instantaneous Earth gravity is given as $g^E$ in the ECEF frame, and the notation $[\omega_{IE}^E\times]$ represents the cross product matrix representation of the vector $\omega_{IE}^E$ as shown in Eq. 17.

$$\Delta\bar{v}_{EB}^E = \bar{C}_B^E\Delta\tilde{v}_{IB}^B - g^E\Delta t - [\omega_{IE}^E\times][\omega_{IE}^E\times]\bar{P}^E\Delta t - 2\omega_{IE}^E\times\bar{V}^E\Delta t \quad (16)$$

$$[\omega_{IE}^E\times] = \begin{bmatrix} \omega_x \\ \omega_y \\ \omega_z \end{bmatrix}\begin{bmatrix} 0 & \omega_z & -\omega_y \\ -\omega_z & 0 & \omega_x \\ \omega_y & -\omega_x & 0 \end{bmatrix} \quad (17)$$

From this point a straight Euler type of integration can be used to estimate velocity and position:

$$\bar{V}^E(t+\Delta t) = \bar{V}^E(t) + \Delta\bar{v}_{EB}^E \quad (18)$$

$$\bar{P}^E(t+\Delta t) = \bar{P}^E(t) + \bar{V}^E(t+\Delta t)\Delta t \quad (19)$$

Any other such suitable methods can be used to improve the numerical performance, such as, for example, Runge-Kutta integration schemes.

Perturbations and Error Propagation

This section describes a linearized propagation equation for how the unknown errors in the acceleration and angular rate $\delta b_v$ and $\delta b_\Theta$ propagate into errors in the navigation state. The perturbations and error propagation section ends with a stochastic dynamics model for the error propagation suitable for use in the dynamics of an Extended Kalman Filter.

Linear perturbations are defined in each of the state variables. The perturbations define the true values relative to the estimates plus an unknown error to be estimated.

$$P^E = \bar{P}^E + \delta P^E \quad (20)$$

$$V^E = \bar{V}^E + \delta V^E \quad (21)$$

The linearized error in the rotation matrix $\bar{C}_B^E$ nonlinear in structure. The definition of the rotation error is defined in Eq. 22. In this equation, the I matrix is the identity matrix. The vector $\delta\gamma$ is defined as the linearized error in the Euler angles $\bar{\gamma}$ used to construct $\bar{C}_B^E$ using Eq. 11.

$$C_B^E = \bar{C}_B^E(I + [\delta\gamma\times]) \quad (22)$$

The clock bias term $c\tau$ is assumed to have a white noise model as shown in Eq. 23.

$$c\tau = \bar{c\tau} + c\delta\tau \quad (23)$$

The clock bias error is driven by a discrete time stochastic process as shown in Eq. 24.

$$c\delta\tau(t+\Delta t) = c\delta\tau(t) + v_\tau \quad (24)$$

The IMU bias perturbations were defined in Eq. 5 and Eq. 6 with dynamics defined in Eq. 7 and Eq. 8, respectively.

Given these definitions, an error state δx is defined as the vector composed of the errors in the position, velocity, attitude, accelerometers, and rate gyros, as shown in Eq. 25:

$$\delta x = \begin{bmatrix} \delta P^E \\ \delta V^E \\ \delta \gamma \\ \delta b_{\Delta v} \\ \delta b_{\Delta \Theta} \\ c \delta \tau \end{bmatrix} \quad (25)$$

The stochastic, discrete time propagation equation is given in Eq. 26. It was generated by substitution of the perturbation errors into the strap down equations of motion and eliminating terms with order greater than one. In this case, the state transition matrix $\Phi(t, t+\Delta t)$ is defined in Eq. 27. A stochastic error term $\Gamma(t, t+\Delta t)$ is defined in Eq. 28 where the stochastic error ν is assumed to include the random error in the accelerometers, angular rate measurements, and the clock bias. The vector ν is defined in Eq. 29.

$$\delta x(t + \Delta t) = \Phi(t, t + \Delta t)\delta x(t) + \Gamma(t, t + \Delta t)\nu \quad (26)$$

$$\Phi(t, t + \Delta t) \approx I_{16 \times 16} + A\Delta t \quad (27)$$

$$A = \begin{bmatrix} 0 & I_{3\times 3} & 0 & 0 & 0 & 0 \\ -([\omega_{IE}^E \times][\omega_{IE}^E \times] - G^E) & -2[\omega_{IE}^E \times] & -2\overline{C}_B^E[\Delta \overline{v}_{EB}^E \times]/\Delta t & 0 & 0 & 0 \\ 0 & 0 & -[\Delta \overline{\Theta}_{EB}^B \times]/\Delta t & 0 & \frac{1}{2}I & 0 \\ 0 & 0 & 0 & -\frac{1}{\tau_{\Delta v}} & 0 & 0 \\ 0 & 0 & 0 & 0 & -\frac{1}{\tau_{\Delta \Theta}}I & 0 \\ 0 & 0 & 0 & 0 & 0 & 0 \end{bmatrix}$$

The 3×3 matrix $G^E$ is derived numerically as the perturbation of the gravity vector's dependence upon vehicle location. This matrix compensates for the fact that the gravity models change with vehicle position. It is gravity model specific, although the method presented here is generic with respect to the gravity model chosen.

Note that a typical noise value is the bias time constants. The scalar values $\tau_{\Delta v}$ and $\tau_{\Delta \Theta}$ represent the time constants associated with the bias random walk.

$$\Gamma(t, t + \Delta t) \approx \left(\Delta t I + \frac{\Delta t^2}{2}A\right) \begin{bmatrix} 0 & 0 & 0 \\ 0 & 0 & 0 \\ 0 & 0 & 0 \\ \overline{C}_B^E & 0 & 0 \\ 0 & \frac{1}{2}I & 0 \\ 0 & 0 & 1 \end{bmatrix} \quad (28)$$

$$\nu = \begin{bmatrix} \nu_{\Delta v} \\ \nu_{\Delta \Theta} \\ \nu_\tau \end{bmatrix} \quad (29)$$

The noise values $\nu_{\Delta v}$, $\nu_{\Delta \Theta}$, and $\nu_\tau$ are here modeled as zero mean, white noise processes. Each one is a 3×1 vector except $\nu_\tau$ which is a scalar. The vector ν is therefore 7×1. Given an initial uncertainty $M = E[\delta x^T \delta x]$, the covariance propagates forward in time using Eq. 30 with process noise $W = E[\nu^T \nu]$.

$$P(t+\Delta t) = \Phi(t, t+\Delta t)M\Phi^t(t, t+\Delta t) + \Gamma(t, t+\Delta t)W\Gamma^T(t, t+\Delta t) \quad (30)$$

Other error models for the inertial measurements are possible such as using misalignment, scale factor, or temperature effects adding states as appropriate. Higher order clock modeling can also be employed.

The GPS measurement correction model used to estimate the error state δx defined in this section using an Extended Kalman Filter is described next in the GPS Correction of Inertial Errors section.

GPS Correction of Inertial Errors

This section describes the GPS measurement equation for a variety of frequencies and observables. The carrier phase measurements are affected by the carrier phase wind up. Carrier phase wind up causes a phase advancement that is proportional to the rotation of the GPS antenna. This rotation provides extra information to compensate for the yaw bias. As described by Hong, et. al., in "Observability Analysis of GPS Aided INS," Proceedings of the 2000 Institute of Navigation, Salt Lake City, Utah, September 2000, yaw bias is weakly observable when corrected by GPS.

Some embodiments of the inventive system and method as described herein use a new measurement model that takes advantage of new results in GIPSY (GNSS (Global Navigation and Satellite Systems)—Inferred Positioning System and Orbital Analysis Software) software processing, which employs a windup model to estimate the attitude of the satellite spacecraft. As described herein, a wind up model can now be used to further compensate an inertial system.

GPS Measurement Model

A simplified model is described hereinbelow for the carrier phase measurements. The model can be applied to the L1, L2, frequencies, or the ionosphere free combination LC. This model can also be applied to other frequencies such as L5. A method known in the art is used to resolve the ambiguity between the satellite and the GPS receiver on the vehicle. Such methods have been described, for example, by Bertiger, et. al., in "Single Receiver Phase Ambiguity Resolution With GPS Data," Submitted to the Journal of Geodesy. Eq. 31 defines the error model in terms of the state error. Note that $\phi_i$ represents the carrier phase from satellite i to the GPS receiver and no longer represents the roll angle when defined in Eq. 10. From this point forward, $\phi$ will be used explicitly for the carrier phase. The roll angle is assumed to be part of the vector $\gamma$.

$$\lambda(\tilde{\phi}_i + N) = \bar{\rho}_i + H_i \delta x + \phi_{xi} - \phi_{ix} + \eta_i \tag{31}$$

The measurement model for the carrier phase measurement $\tilde{\phi}_i$ in Eq. 31 lumps ionosphere and troposphere errors into the noise term $\eta$ for simplicity of the measurements. There are multiple ways for estimating and removing the ionosphere and troposphere estimates such as using the ionosphere free carrier phase combination as for example, have been described by Blewitt, et. al, in "Carrier Phase Ambiguity Resolution for the Global Positioning System Applied to Geodetic Baselines up to 2000 km," Journal of Geophysical Research, Vol. 94, No. B8, Pages 10, 187-10, 203, Aug. 10, 1989, or by Blewitt, et. al., in "Carrier Phase Ambiguity Resolution for the Global Positioning System Applied to Geodetic Baselines up to 2000 km," Journal of Geophysical Research, Vol. 94, No. B8, Pages 10, 187-10, 203, Aug. 10, 1989, and then estimating the tropospheric conditions, as has been described by Bar-Sever, et. al., in "Estimating horizontal gradients of tropospheric path delay with a single GPS receiver," Journal of Geophysical Research, Vol. 103, No. B3, Pages 5019-5035, Mar. 10, 1998. The subscript i refers to the GPS satellite number and the subscript x refers to errors associated with the vehicle state. The integer ambiguity $N_j$ is estimated using a separate filter such as has been described by Bertiger, et. al.

The term $\phi_{xi}$ refers to the carrier phase wind up term at the vehicle's GPS receiver caused by satellite i. In addition to the other terms, the present description defines how errors in the vehicle state contribute to the errors in $\phi_{xi}$. Similarly, the GPS satellite transmitter has a phase wind up $\phi_{ix}$ which is associated with the motion of the GPS satellite. The present description assumes that the satellite wind up is fixed, known through an outside estimation process such as GIPSY, or transmitted to the vehicle for use in data processing.

GPS Range Based Error Model

The true range and clock biases are lumped together into $\rho_i$ in Eq. 32. The true values are a function of the estimated range and clock $\bar{\rho}_i$ and errors due to the state estimate error $\delta x$. The range estimate $\bar{\rho}_i$ is defined in Eq. 33 in which $\bar{P}_i^E$ is the estimate of the GPS satellite position and $c\bar{\tau}_i$ is the estimate of the GPS clock bias. The position of the vehicle $\bar{P}^E$ is the center of the IMU instrument. The lever arm $L_{IMU}^B$ defines the location of the GPS antenna phase center relative to the center of the IMU in the vehicle body frame. It is assumed that this lever arm is known, calibrated and fixed throughout the motion of a vehicle or platform (e.g. an aircraft flight). However, error models can be implemented to include errors in this lever arm.

$$\rho_i = \bar{\rho}_i + H_i \delta x \tag{32}$$

$$\bar{\rho}_i = \|\bar{P}_i^E - \bar{P}^E - \bar{C}_B^E L_{IMU}^B\| + c\bar{\tau}_i - c\bar{\tau} \tag{33}$$

The measurement sensitivity matrix $H_i$, defined in Eq. 34, refers to perturbations with respect to the state errors.

$$H_i = \frac{-(\bar{P}_i^E - \bar{P}^E - \bar{C}_B^E L_{IMU}^B)}{\|\bar{P}_i^E - \bar{P}^E - \bar{C}_B^E L_{IMU}^B\|} [I \quad 0 \quad \bar{C}_B^E [L_{IMU}^B \times] \quad 0 \quad 0 \quad 1] \tag{34}$$

The line of sight vector from the GPS antenna to the GPS satellite as in Eq. 35, can be simplified for the following development:

$$H_{los_i}^E = \frac{(\bar{P}_i^E - \bar{P}^E - \bar{C}_B^E L_{IMU}^B)}{\|\bar{P}_i^E - \bar{P}^E - \bar{C}_B^E L_{IMU}^B\|} \tag{35}$$

Now turning to "observability", the measurement sensitivity matrix defined in Eq. 34 is weakly observable. The issue of observability centers around the fact that even though position is fully observable and all of the other errors such as velocity and attitude integrate into position, the attitude is best observed through the lever arm $L_{IMU}^B$. However, the sensitivity matrix is unobservable along any attitude vector error parallel to $L_{IMU}^B$, because of the cross product term in Eq. 34. Therefore, there is always a lack of direct observability in attitude along that line which can be estimated, when possible, through integration of attitude error into velocity and then into position through the error dynamics in Eq. 27. This integration uses acceleration of the vehicle in order to enable the attitude errors to propagate into velocity. Without acceleration, the errors do not propagate and the full state is unobservable. Hong, et. al., in "Observability Analysis of GPS Aided INS," Proceedings of the 2000 Institute of Navigation, Salt Lake City, Utah, September 2000, describe adding multiple GPS antennas separated by different lever arms to enable observability of the complete attitude error state. Some embodiments of the instant invention achieve the full state observability by using a wind up model with only a single GPS antenna.

Also, while Bertiger typically estimates the integer ambiguity which will include the modulo $2\pi$ wind up angle, the description herein estimates a complete phase wind up angle without the modulo process. The phase wind up accumulates over time and $\phi_{xi}$ is a variable that is book-kept during the entire navigation process on a satellite by satellite basis. Similarly, the accumulated value for $\phi_{ix}$ is also book kept.

Wind Up Error Model

In Eq. 31, the phase wind up term due to the yaw motion of the satellite $\phi_{ix}$, and the phase wind up term due to the motion of the vehicle $\phi_{xi}$ were introduced. The dipole vector equation is given in Eq. 37. The method uses effective dipoles representing the antenna at the receiver and the antenna at the GPS satellite. An antenna coordinate frame is defined such the $\bar{i}$ axis points in the direction of the dipole whose signal is used directly, the $\bar{j}$ axis points in the direction of the dipole signal that is delayed by 90 degrees and the $\bar{k}$ axis completes the right handed coordinate system. Then a dipole vector can be constructed to describe the effective dipole angle rotated into a plane perpendicular to the line of sight vector $H_{los_i}^E$ of Eq. 35 represented in the ECEF frame. A known rotation matrix $C_G^I$ rotates from the GPS antenna frame to the IMU frame. The unit vectors $\bar{i}$, $\bar{j}$, and $\bar{k}$ are also assumed known in the antenna reference frame. The rotation $C_B^E$ rotates from the IMU frame to the ECEF frame relating GPS position estimates to the antenna frame.

$$H_{los_i}^G = C_I^G C_E^B H_{los_i}^E \tag{36}$$

$$d_i^G = \bar{i} - H_{los_i}^G ((H_{los_i}^G)^T \bar{i}) + H_{los_i}^G \times \bar{j} \tag{37}$$

As described in Wu, the first two terms of Eq. 37 represent the projection of the x axis onto a plane perpendicular to $H_{los_i}^G$ and the third term represents the y-axis onto the same plane rotated by 90 degrees. The effective wind up angle is defined using the wind up vector as shown in Eq. 39.

$$d_i^G = \begin{bmatrix} d_x \\ d_y \\ d_z \end{bmatrix} \quad (38)$$

$$\phi_{xi} = \tan^{-1}\left(\frac{d_y}{d_x}\right) \quad (39)$$

A similar relationship holds for the satellite effective wind up. $d_i^i$ in Eq. 40 is defined for unit vectors $\bar{i}_i, \bar{j}_i$, and $\bar{k}_i$ representing the unit directions in the satellite broadcast antenna dipole. Unlike Wu, the effect on wind up on the vehicle and the satellite are defined here separately, arguing that the satellite errors are known and using the vehicle wind up to correct the inertial heading angle.

$$d_i^i = \bar{i}_i - H_{los_i}^G \left((H_{los_i}^G)^T \bar{i}_i\right) - H_{los_i}^G \times \bar{j}_i \quad (40)$$

$$d_i^i = \begin{bmatrix} d_x^i \\ d_y^i \\ d_z^i \end{bmatrix} \quad (41)$$

The satellite phase advance due to the dipole rotation is therefore:

$$\phi_{ix} = \tan_1\left(\frac{d_y^i}{d_x^i}\right) \quad (42)$$

The error model for the terrestrial vehicle is now defined in terms of the navigation state and error states previously defined. First, the dipole equation in Eq. 37 is multiplied by the range in Eq. 43 to form a new, equivalent dipole equation in Eq. 44.

$$h = \|\bar{P}_i^E - \bar{P}^E - \bar{C}_B^E L_{IMU}^B\| \quad (43)$$

$$D_i^G = h d_i^G \quad (44)$$
$$= h\bar{i} - h H_{los_i}^G \left((H_{los_i}^G)^T \bar{i}\right) - h H_{los_i}^G \times \bar{j}$$
$$= h\bar{i} - ((C_I^G \bar{C}_E^B H_{los_i}^E)^T \bar{i})(\bar{P}_i^E - \bar{P}^E - \bar{C}_B^E L_{IMU}^B) +$$
$$(\bar{P}_i^E - \bar{P}^E - \bar{C}_B^E L_{IMU}^B) \times \bar{j}$$

Using the function in Eq. 43 to normalize the dipole vector makes several assumptions about the linearity of the system and neglects higher order terms. However, the range is dominated by the relative position $\bar{P}_i^E - \bar{P}^E$. For terrestrial applications, the relative position vector has a norm of about $2.0 \times 10^7$ meters and errors in each axis are expected to be less than a meter. Therefore, uncertainty in position contributes less than $1.0 \times 10^{-7}$. This error contributes only mildly to estimation error.

Perturbations about the errors in vehicle position $P^E$ and attitude $C_B^E$ are now described as performed previously. A Modified Gain Extended Kalman Filter is then used to relate these perturbations to the wind up angle $\phi$.

$$\phi_{xi} = \bar{\phi}_{xi} + H_{MGEKF} H_{\phi xi} H_D \delta x \quad (45)$$

First the perturbations in the $D_i^G$ vector by substituting in the perturbations for the position and attitude estimates, combining terms, and eliminating terms of order greater than 2.

$$D_i^G = \bar{D}_i^G + \delta D_i^G \quad (46)$$
$$= \bar{D}_i^G + H_D \delta x$$

The a priori estimate $\bar{D}_i^G$ is defined in Eq. 47. The sensitivity matrix $H_D$ is defined in Eq. 51, with higher order perturbations neglected.

$$\bar{D}_i^G = h\bar{i} - ((C_I^G \bar{C}_E^B H_{los_i}^E)^T \bar{i})(C_I^B \bar{C}_E^B (\bar{P}_i^E - \bar{P}^E) - C_I^G L_{IMU}^B) + \quad (47)$$
$$(C_I^G \bar{C}_E^B (\bar{P}_i^E - \bar{P}^E) - C_I^G L_{IMU}^B) \times \bar{j}$$

$$\bar{D}_i^G = \begin{bmatrix} \bar{D}_x \\ \bar{D}_y \\ \bar{D}_z \end{bmatrix} \quad (48)$$

The translation from $\delta D_i^G$ is performed in the following steps where perturbation terms of order greater than one have been neglected:

$$\delta D_i = -\{(H^E)^T \bar{C}_B^E [\delta \gamma \times] C_G^I \bar{i}\}[C_I^G \bar{C}_E^B (\bar{P}_i^E - \bar{P}^E) + C_I^G L_{IMU}^B] - \quad (49)$$
$$\{(H^E)^T \bar{C}_B^E C_G^I \bar{i}\} C_I^G \bar{C}_E^B (\delta P_i^E - \delta P^E) -$$
$$\{(H^E)^T \bar{C}_B^E C_G^I \bar{i}\}[C_I^G [-\delta \gamma \times] \bar{C}_E^B (\bar{P}_i^E - \bar{P}^E)] +$$
$$C_I^G \bar{C}_E^B (\delta P_I^E - \delta P^E) \times \bar{j} + C_I^G [-\delta \gamma \times] \bar{C}_E^B (\bar{P}_i^E - \bar{P}^E) \times \bar{j}$$

Noting that $(a^T b \|a\|) a = (a^T b) a \|a\|$, and that $[a \times] b = -[b \times] a$, we can then reduce line by line, separating out the perturbation terms.

$$\delta D_i = -\{[C_I^G \bar{C}_E^B (\bar{P}_i^E - \bar{P}^E) + C_I^G L_{IMU}^B]^T \bar{i}\} C_I^G [(\bar{C}_E^B H^E) \times] \delta \gamma - \quad (50)$$
$$\{(H^E)^T \bar{C}_B^E C_G^I \bar{i}\} C_I^G \bar{C}_E^B (\delta P_i^E - \delta P^E) -$$
$$\{(H^E)^T \bar{C}_B^E C_G^I \bar{i}\}[C_I^G [(\bar{C}_E^B (\bar{P}_i^E - \bar{P}^E)) \times] \delta \gamma +$$
$$C_I^G \bar{C}_E^B [-\bar{j} \times] (\delta P_i^E - \delta P^E) - C_I^G [([(\bar{C}_E^B (\bar{P}_i^E - \bar{P}^E)) \times] \bar{j}) \times] \delta \gamma$$

If we ignore errors in the satellite geometry $\delta P_i^E$ then we can reduce $\delta D_i = H_D \delta x$ where $H_D$ is defined in Eq. 51.

$$H_D = [H_{D_P} \quad 0_{3 \times 3} \quad H_{D_\gamma} \quad 0_{3 \times 3} \quad 0_{3 \times 3} \quad 0] \quad (51)$$

$$H_{D_P} = -\{(H^E)^T \bar{C}_B^E C_G^I \bar{i}\} C_I^G \bar{C}_E^B + C_I^G \bar{C}_E^B [-\bar{j} \times] \quad (52)$$

-continued $$H_{D_y} = \qquad (53)$$
$$-\{[C_I^G \overline{C}_E^B(\overline{P}_i^E - \overline{P}^E) + C_I^G L_{IMU}^B]^T \hat{i}\} C_I^G [(\overline{C}_E^B H^E) \times] - \{(H^E)^T \overline{C}_B^E C_G^I \hat{i}\}$$
$$C_I^G [(\overline{C}_E^B(\overline{P}_i^E - \overline{P}^E)) \times] - C_I^G [([\overline{C}_E^B(\overline{P}_i^E - \overline{P}^E)] \times \hat{j}) \times] \approx$$
$$-2\{(H^E)^T \overline{C}_B^E C_G^I \hat{i}\} C_I^G [(\overline{C}_E^B(\overline{P}_i^E - \overline{P}^E)) \times] -$$
$$C_I^G [([(\overline{C}_E^B(\overline{P}_i^E - \overline{P}^E)) \times] \hat{j}) \times]$$

Note that there are two cross product matrix terms in Eq. 53 which define the observability of the attitude. Attitude is unobservable along the line of sight vector in the first term, and unobservable along the cross product of the line of sight vector and the $\hat{j}$ axis. In which ever direction the line of sight points, the error in the z axis of the attitude error $\delta\gamma$ is observable. However, the error model is incomplete since one goal is to estimate the error in $\delta P^E$ and $\delta\gamma$ using the wind up error $\phi_x$.

Eq. 45 uses a form of the MGEKF (Modified Gain Extended Kalman Filter) as described by Wolfe, et. al., in "Target Association Using Detection Methods," Journal of Guidance, Control and Dynamics, Vol. 25, No. 6, November-December 2002, for target tracking. The solution uses a transformation of variables in the following steps. Using the relationship of Eq. 54, it is possible to rewrite Eq. 45 into Eq. 59 using the newly formed residual in Eq. 55.

$$tan^{-1}(a) - tan^{-1}(b) = tan^{-1}\left(\frac{a-b}{1+ab}\right) \qquad (54)$$

$$r_i = \lambda(\tilde{\phi}_i + N_i) - \overline{\rho}_i - \overline{\phi}_{xi} - \overline{\phi}_{ix} = tan^{-1}(\Psi) \qquad (55)$$

$$\tilde{\beta}_i = \lambda(\tilde{\phi}_i + N_i) - \overline{\rho}_i - \overline{\phi}_{ix} \qquad (56)$$

$$\overline{\beta}_i = \overline{\phi}_{xi} \qquad (57)$$

$$r_i = \tilde{\beta}_i - \overline{\beta}_i = tan^{-1}(\Psi) \qquad (58)$$

$$r_i = \frac{-F tan^{-1}(\Psi)}{\Psi}[\sin(\tilde{\beta}_i) \quad -\cos(\tilde{\beta}_i) \quad 0] H_D \delta x \qquad (59)$$

$$F = \frac{1}{[\cos(\tilde{\beta})\overline{D}_x + \sin(\tilde{\beta})\overline{D}_y]} \qquad (60)$$

Therefore, three matrices define the relationship of the error in the state estimate $\delta x$ on the phase wind up of the vehicle, $\overline{\phi}_{xi}$:

$$\phi_{xi} - \overline{\phi}_{xi} = H_{MGEKF} H_{\phi i} H_D \delta x \qquad (61)$$

$$H_{MGEKF} = \frac{-F tan^{-1}(\Psi)}{\Psi} \qquad (62)$$

$$H_{\phi i} = [\sin(\tilde{\beta}_i) \quad -\cos(\tilde{\beta}_i) \quad 0] \qquad (63)$$

Alternative Wind Up Model

While the MGEKF works best when the residual is purely an angular system, as described hereinbelow, the MGEKF can be used in a slightly different application. In the present case, the measurement residual is partly range based and partly angular based. A more direct approach, however, produces similar results.

$$\overline{\phi}_{xi} = tan^{-1}\left(\frac{\overline{D}_y}{\overline{D}_x}\right) \qquad (64)$$

Perturbations can be taken with respect to $\overline{D}_x$ and $\overline{D}_y$ as shown below.

$$d\overline{\phi}_{xi} = \frac{2}{1+\left(\frac{\overline{D}_y}{\overline{D}_x}\right)^2} \frac{\overline{D}_y}{\overline{D}_x}\left(\frac{\overline{D}_x(d\overline{D}_y) - \overline{D}_y(d\overline{D}_x)}{\overline{D}_x^2}\right) \qquad (65)$$

Therefore, the error can be written in the form in Eq. 66 with $H_A$ defined in Eq. 67, $H_B$ defined in Eq. 68 and $H_D$ defined previously in Eq. 51.

$$\phi_{xi} - \overline{\phi}_{xi} = H_A H_B H_D \delta x \qquad (66)$$

$$H_A = \frac{2}{1+\left(\frac{\overline{D}_y}{\overline{D}_x}\right)^2} \frac{\overline{D}_y}{\overline{D}_x} \qquad (67)$$

$$H_B = \left[\frac{1}{\overline{D}_x} \quad -\frac{\overline{D}_y}{\overline{D}_x^2} \quad 0\right] \qquad (68)$$

Thus, it can be seen that the direct form presented here is very similar in form to the MGEKF.

Total Error Model

We now combine the error models from all three sources: range, yaw wind up, and geometry wind up. Also, the basic model with Eq. 69, and each of the definitions of the a priori terms are repeated.

$$\lambda(\tilde{\phi}_i + N_i) = \overline{\rho}_i + \overline{\phi}_{xi} - \overline{\phi}_{ix} + H\delta x + \eta_i \qquad (69)$$

The a priori range $\overline{\rho}_i$ is defined in Eq. 70 with variables defined previously.

$$\overline{\rho}_i = \|\overline{P}_i^E - \overline{P}^E - \overline{C}_B^E L_{IMU}^B\| + c\overline{\tau}_i - c\overline{\tau} \qquad (70)$$

The a priori wind up due to the vehicle's GPS antenna rotation is defined in Eq. 71. An initial wind up angle $\overline{\phi}_{xi}(t_0)$ is defined at the beginning of the phase arc. This initial condition can be defined as the current estimate of the phase wind up given the vehicle attitude.

$$\overline{\phi}_{xi} = (\overline{\phi}_{xi}(t) - \overline{\phi}_{xi}(t_0)) \qquad (71)$$

The a priori wind up due to the vehicle's satellite antenna rotation is defined in Eq. 72 where $\overline{\phi}_{ix}$ is the satellite wind up of the antenna and defined in Eq. 74 with initial condition $\overline{\phi}_{ix}(t_0)$.

$$\overline{\phi}_{ix} = (\overline{\phi}_{ix}(t) - \overline{\phi}_{ix}(t_0)) \qquad (72)$$

$$\overline{\phi}_{xi} = tan^{-1}\frac{\overline{D}_y}{\overline{D}_x} \qquad (73)$$

$$\overline{\phi}_{ix} = tan^{-1}\frac{d_y^i}{d_z^i} \qquad (74)$$

The sensitivity matrix H is defined in Eq. 75 with $H_i$ defined in Eq. 34, $H_{MGEKF}$ defined in Eq. 62, $H_{\phi i}$ defined in Eq. 63, $H_D$ defined in Eq. 51. The state error for the vehicle is defined in Eq. 25.

$$H=H_i+H_{MGEKF}H_{\phi i}H_D \quad (75)$$

A similar model can be constructed to estimate the yaw angle of the GPS satellite and the effect on wind up $\phi_{ix}$. However, this is neglected at this point because the GPS satellites do not transmit yaw angle and other means are available within GIPSY to estimate the satellite yaw angle as described by Bar-Sever, et. al., in "Fixing the GPS Bad Attitude: Modeling GPS Satellite Yaw During Eclipse Seasons," Navigation, Vol. 43, NO 1, Spring 1996. Therefore, for the present case, $\phi_{ix}$ is assumed fixed, known precisely, or estimated through another estimation scheme. With a full set of static ground stations, the method presented here could be used to estimate the attitude of any or all of the GPS constellation as well as the position.

An Extended Kalman Filter to estimate the errors in the state δx using the measurements in Eq. 69 and the dynamics defined in Eq. 26 can be formed. Correction of the state with the estimated state error takes place as has been described by Williamson, et. al., in "Sensor Fusion Applied to Autonomous Aerial Refueling," Journal of Guidance, Control, and Dynamics, Vol. 32, No. 1, January-February 2009.

Filtering

Using the error model for the strap down equations of motion described hereinabove in the section Perturbations and Error Propagation, and the measurement model in the section Total Error Model, an Extended Kalman Filter (EKF) or Square Root Information Filter (SRIF) which can be used to correct the navigation state generated using the strap down equations of motion for errors due to the accelerometer and gyro biases is now described. The filter proceeds according to the following steps:

Propagating the initial estimate of the state in Eq. 9 forward in time by Δt using inertial measurements of acceleration and angular rate through the strap down equations of motion defined as described hereinabove in the section Strap Down Equations of Motion.

Propagating the initial error covariance M forward in time using Eq. 30.

$$P(t+\Delta t)=\Phi(t,t+\Delta t)M\Phi^t(t,t+\Delta t)+\Gamma(t,t+\Delta t)W\Gamma^t(t,t+\Delta t) \quad (30)$$

In this case W is the process noise associated with the error model for the IMU, t is time, Δt is the time increment, Φ is the linearized state transition matrix defined in Eq. 27, and Γ is the linearized matrix defined in Eq. 28.

Repeating the first two steps until a GPS measurement is available and the state estimate is time aligned with the GPS measurement.

Forming the code and carrier phase residuals for each satellite i using the current best estimate of the state:

$$r_{\phi_i}=\lambda(\tilde{\phi}_i+N_i)-\bar{\rho}_i-\bar{\phi}_{xi}+\bar{\phi}_{ix} \quad (76)$$

$$r_{\rho_i}=\tilde{\rho}_i-\bar{\rho}_i \quad (77)$$

Calculating $\bar{\phi}_{xi}$ as shown in Eq. 39 and $\bar{\phi}_{ix}$ as shown in Eq. 42.

Calculating the value of $\bar{\rho}_i$ as shown in Eq. 33.

Calculating the measurement sensitivity matrix H as shown in Eq. 75.

Updating the covariance matrix M $$M=[P+H^TV^{-1}H]^{-1} \quad (78)$$

In this case V represents the measurement covariance of the code and carrier phase measurements.

Calculating the gain matrix K as:

$$K=PH^TV^{-1} \quad (79)$$

Calculating the correction to the navigation state δx as:

$$\delta\hat{x}=Kr \quad (81)$$

in this case, r is the column vector of all available code and carrier phase residuals $r_{\phi_i}$ and $r_{\rho_i}$ at time t.

Applying the calculated correction δx to the navigation state $\bar{x}$ using the method described by Williamson, et. al., in "Sensor Fusion Applied to Autonomous Aerial Refueling, Journal of Guidance, Control, and Dynamics," Vol. 32, No. 1, January-February 2009

Repeating this process propagating through the next set of inertial data until the next set of GPS data is available Observability As described by Hong, et. al, in "Observability Analysis of GPS Aided INS," Proceedings of the 2000 Institute of Navigation, Salt Lake City, Utah, September 2000, GPS/INS systems are susceptible to errors related to a lack of direct observability. We now describe how the wind up model ensures that the system is completely observable in attitude as well as position (full state observability).

The observability can be reduced to a rank test of the following matrix which includes the attitude sensitivity of Eq. 34 and the two cross product terms of the wind up error model sensitivity to attitude in Eq. 53. The condensed observability matrix in Eq. 76 shows that the first term is observability to all errors in δγ except errors along the lever arm vector $L_{IMU}^B$. The second term shows that errors are observable except along the line of sight vector from the receiver to the satellite in the antenna frame. The third term is observable in all axes except cross product of the line of site vector crossed with the antenna $\bar{j}$ axis.

$$H_{obs}=\bar{C}_B^E[L_{IMU}^B\times]+C_I^G[(\bar{C}_E^B(\bar{P}_i^E-\bar{P}^E))\times]+C_I^G[((\bar{C}_E^B(\bar{P}_i^E-\bar{P}^E))\times\bar{j})\times] \quad (82)$$

$$\text{rank}(H_{obs})>=3 \quad (83)$$

Consider a typical installation in which the GPS antenna is directly above an IMU by about 1 meter and where the IMU and GPS coordinate frames are co-incident (accounting for the rotation from fore-starboard-down to fore-port-up). Then the first term in Eq. 76 is unobservable about the vertical axis, which is parallel to the lever arm. Assuming a worst case where the satellite was directly overhead, the second term is also unobservable about the z axis since the line of sight vector is parallel to the z axis. However, the third term for a satellite directly overhead is unobservable in the x-axis only ($\bar{k}\times\bar{j}=-\bar{i}$). The y and z axes are observable through this term. Therefore, the system is completely observable. While special cases may arise which prohibit observability for a particular satellite along a particular line of sight vector, the plurality of GPS satellites will ensure observability of the full attitude state.

Differential GPS

The methods described herein are applicable to short baseline GPS solutions in which the single or double differenced carrier phase measurements are used to provide a relative range between two vehicles. Wide lane carrier phase is typically used as a preferred measurement, since it does not exhibit the effect of phase wind up. The measurement model presented here can be used to enhance the previous methods and enable L1, L2 or ionosphere free estimation. If the difference is made relative to a static ground station, the method can be further simplified, since the ground station does not have any change in attitude and would not likely need an inertial system. The satellite common mode phase wind up is removed from the single differenced measurements.

Estimation of Satellite Variables

As described hereinabove, the satellite transmitter antennas have a known location, a known clock bias, and a known antenna attitude. These values can be provided by a high fidelity model such as the one developed in GIPSY. However, it is possible to replace the terms associated with the GPS receiver with the transmitter in order to estimate a transmitter location precisely. The problem is that one GPS receiver on the ground cannot be used to estimate the entire constellation of GPS satellites. However, multiple GPS receivers, such as the network of ground based receivers designed to support GIPSY can be used to generate enough measurements to make this model feasible. It is contemplated that the inventive method described herein can provide an enhancement to the existing attitude system in GIPSY.

The Estimation of Attitude Using Multiple Antennas

It has been common in GPS to utilize multiple GPS antennas for attitude. However, the basic scheme used is to use range measurements or estimate the integer ambiguity between two or more GPS receiver antennas located on a common vehicle. It is generally assumed that the antennas are rigidly spaced with a reasonable baseline. Since the baseline is precisely known to a few centimeters in the ECEF reference frame, a lever arm of 1 meter between GPS antennas could be used to provide an attitude estimate with accuracies on the order of 0.01 radians, or 0.5 degrees. The longer the baseline, the more accurate the attitude.

The method described herein suggests an alternative approach. In addition to taking advantage of the integer wind up to make the entire attitude estimate observable, it is possible to further enhance this approach using multiple antennas. However, instead of using a long baseline, the antennas could be placed next to each other, but at different angles. Different angles would make sure that each antenna error model would have a different dipole definition. Common satellites in view affect the antennas differently. A multiple antenna element design where the dipole vectors were amplified or exagerated in $\bar{i}$ over $\bar{j}$ (not radially symmetric) could be used to help identify the initial condition. Multiple elements could also be set in a small circle with only a few centimeters of baseline separation and used to provide complete heading information as well as pitch and roll information without having to resort to a longer baseline. Such a multiple antenna system can use a separate set of RF front ends on the GPS receiver for each antenna with carrier phase tracking loops on each antenna. The result can be a small, solid state device capable of measuring vehicle attitude from essentially a small antenna foot print.

DEFINITIONS

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording data for later use (e.g., writing data to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing data to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically includes a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is the to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of stabilizing an inertial navigation system (INS), comprising the steps of:
   performing the following steps in any order:
      receiving data from an inertial navigation system having an inertial measurement unit (IMU); and
      receiving a finite number of carrier phase observables using at least one GPS receiver from a plurality of GPS satellites;
   performing the following series of calculations:
      calculating a phase wind up correction;
      correcting at least one of said finite number of carrier phase observables using said phase wind up correction; and
      calculating a corrected IMU attitude or velocity or position using said corrected at least one of said finite number of carrier phase observables; and
   performing a step selected from the steps consisting of recording said corrected IMU attitude or velocity or position, reporting said corrected IMU attitude or velocity to a user, and providing said corrected IMU attitude or velocity or position to another process that uses the corrected IMU attitude or velocity or position.

2. The method of stabilizing an inertial navigation system of claim 1, further comprising the step of providing said corrected IMU attitude or velocity or position to said INS.

3. The method of stabilizing an inertial navigation system of claim 1, wherein said step of calculating a corrected IMU attitude or velocity or position includes calculating a corrected IMU attitude or velocity or position using said corrected at least one of said finite number of carrier phase observables with full state observability.

4. The method of stabilizing an inertial navigation system of claim 1, wherein said steps of calculating a phase wind up correction and correcting at least one of said finite number of carrier phase observables using said phase wind up correction are performed using the following equations:

$$\phi_{xi} = tan^{-1}\left(\frac{d_y}{d_x}\right),$$

and $$\phi_{xi} - \bar{\phi}_{xi} = H_{MGEKF} H_{\phi i} H_D \delta_x,$$

where $$H_{MGEKF} = \frac{-F tan^{-1}(\Psi)}{\Psi},$$

and $$H_{\phi i} = [\sin(\tilde{\beta}_i) - \cos(\tilde{\beta}_i) \ 0].$$

5. The method of stabilizing an inertial navigation system of claim 1, wherein said steps of calculating a phase wind up correction and correcting at least one of said finite number of carrier phase observables using said phase wind up correction are performed using the following equations:

$$\bar{\phi}_{xi} = tan^{-1}\left(\frac{\bar{D}_y}{\bar{D}_x}\right),$$

and $$\phi_{xi} - \bar{\phi}_{xi} = H_A H_B H_D \delta x,$$

where $$H_A = \frac{2}{1 + \left(\frac{\bar{D}_y}{\bar{D}_x}\right)^2} \frac{\bar{D}_y}{\bar{D}_x},$$

and $$H_B = \left[\frac{1}{\bar{D}_x} \ -\frac{\bar{D}_y}{\bar{D}_x^2} \ 0\right].$$

6. The method of stabilizing an inertial navigation system of claim 1, wherein said step of receiving a finite number of carrier phase observables comprises receiving a finite number of carrier phase observables using at least one GPS receiver from a plurality of GPS satellites using a GPS receiver having a plurality of GPS antennas disposed at different angles with different dipole definitions in a coordinate reference system and wherein said step of performing the following series of calculations includes calculating a phase wind up correction for each of said plurality of GPS antennas disposed at different angles.

7. The method of stabilizing an inertial navigation system of claim 1, wherein said step of receiving a finite number of carrier phase observables comprises receiving a finite number of carrier phase observables using at least one GPS receiver from a plurality of GPS satellites using a plurality of GPS antennas disposed substantially in a circle and wherein said step of performing the following series of calculations includes calculating includes calculating a phase wind up correction for each of said plurality of GPS antennas disposed substantially in a circle.

8. The method of stabilizing an inertial navigation system of claim 1, wherein a GPS receiver having at least one GPS antenna is present on a first vehicle, and a second GPS receiver having at least one GPS antenna is configured to perform the method of claim 1 on a second vehicle different from said first vehicle, and further comprising a step of using a single or double differenced carrier phase measurement to provide a range between said first and said second vehicles.

9. The method of stabilizing an inertial navigation system of claim 1, wherein said step of calculating a corrected IMU attitude or velocity or position provides an enhanced accuracy yaw angle.

10. The method of stabilizing an inertial navigation system of claim 1, wherein said step of calculating a corrected IMU attitude or velocity or position includes calculation of an Extended Kalman Filter (EKF) or of a Square Root Information Filter (SRIF).

11. A GPS stabilized inertial navigation system apparatus comprising:
   at least one GPS receiver having at least one GPS antenna;
   an inertial navigation system (INS) having an inertial measurement unit (IMU);
   a data processor communicatively coupled to said at least one GPS receiver and said IMU, said data processor configured to receive a plurality of GPS carrier phase observables from said GPS receiver and attitude and velocity data from said IMU, said data processor including a module having instructions in machine-readable form recorded therein, said data processor configured to perform, when operating under the control of said instructions, a process comprising the steps of:
   calculating a phase wind up correction;
   correcting at least one of said finite number of carrier phase observables using said phase wind up correction; and
   calculating a corrected IMU attitude or velocity or position using said corrected at least one of said finite number of carrier phase observables; and
   at least one device selected from the group of devices consisting of a device configured to record said corrected IMU attitude or velocity or position, a device configured to report said corrected IMU attitude or velocity or position to a user, and a device configured to provide said corrected IMU attitude or velocity or position to another process that uses the corrected IMU attitude or velocity or position.

12. The GPS stabilized inertial navigation system apparatus of claim 11, wherein said INS is configured to receive said corrected IMU attitude or velocity or position to correct an INS attitude or velocity or position.

13. The GPS stabilized inertial navigation system apparatus of claim 11, wherein said data processor is configured to calculate a corrected IMU attitude or velocity or position with full state observability.

14. The GPS stabilized inertial navigation system apparatus of claim 11, further comprising a plurality of GPS antennas disposed at different angles.

15. The GPS stabilized inertial navigation system apparatus of claim 11, further comprising a plurality of GPS antennas disposed substantially in a circle.

16. The GPS stabilized inertial navigation system apparatus of claim 11, wherein said data processor is configured to provide an enhanced accuracy yaw angle.

* * * * *